US009276658B2

(12) United States Patent
Baker et al.

(10) Patent No.: US 9,276,658 B2
(45) Date of Patent: Mar. 1, 2016

(54) METHOD FOR COMMUNICATING IN A MIMO NETWORK

(75) Inventors: Matthew Peter John Baker, Canterbury (GB); Milos Tesanovic, Cambridge (GB); Timothy James Moulsley, Caterham (GB)

(73) Assignee: Koniklijke Phillips N.V., Eindhoven (NL)

( * ) Notice: Subject to any disclaimer, the term of this patent is extended or adjusted under 35 U.S.C. 154(b) by 218 days.

(21) Appl. No.: 13/257,162

(22) PCT Filed: Mar. 16, 2010

(86) PCT No.: PCT/IB2010/051128
§ 371 (c)(1),
(2), (4) Date: Sep. 16, 2011

(87) PCT Pub. No.: WO2010/106490
PCT Pub. Date: Sep. 23, 2010

(65) Prior Publication Data
US 2012/0009917 A1 Jan. 12, 2012

(30) Foreign Application Priority Data

Mar. 17, 2009 (EP) .................................... 09155425

(51) Int. Cl.
*H04B 7/08* (2006.01)
*H04B 7/06* (2006.01)
*H04L 1/00* (2006.01)

(52) U.S. Cl.
CPC ............ *H04B 7/0842* (2013.01); *H04B 7/0665* (2013.01); *H04B 7/0862* (2013.01); *H04L 1/0001* (2013.01); *H04L 1/0025* (2013.01)

(58) Field of Classification Search
CPC .... H04B 7/0639; H04B 7/0456; H04B 7/024; H04B 7/0665; H04B 7/0478; H04B 7/0634; H04B 7/0632; H04W 72/042; H04W 52/146; H04W 52/241; H04W 52/243
USPC ................................ 455/422.1; 370/328, 334
See application file for complete search history.

(56) References Cited

U.S. PATENT DOCUMENTS 8,571,128 B2 * 10/2013 Kim ..................... H04B 7/0417
375/261
8,660,600 B2 * 2/2014 Khandekar ......... H04W 52/146
455/115.4

(Continued)

FOREIGN PATENT DOCUMENTS

JP 2006005908 A 1/2006
WO 2008132689 A1 11/2008

OTHER PUBLICATIONS

Bala et al: "Zero-Forcing Beamforming Codebook Design for Mu-MIMO OFDM Systems"; IEEE 68th Vehicular Technology Conference—VTC 2008. Sep. 2008, pp. 1-5.
Ericsson: "Precoding Consideration in LTE MIMO Downlink"; 3GPP Draft, R1-071044, 3rd Generation Partnership Project, TSG-RAN WG1 #48, Feb. 2007, 11 Page Document.
Wang et al: "Precoding for MIMO-Broadcast Channels With Joint Linear Transmitter and Receiver Design"; IEEE International Symposium on Wireless Communication Systems, Oct. 2008, pp. 424-427.

(Continued)

*Primary Examiner* — Liton Miah

(57) ABSTRACT

The present invention relates to method for communicating in a network, said network comprising a primary station and at least one secondary station having a plurality of antennas, the method comprising the step of the primary station transmitting to a first secondary station an indication of a first receive combining matrix that the first secondary station should use to combine the signals received at its said plurality of antennas from a first subsequent transmission from the primary station.

29 Claims, 2 Drawing Sheets

(56) References Cited

U.S. PATENT DOCUMENTS

| | | |
|---|---|---|
| 2006/0209980 A1 | 9/2006 | Kim et al. |
| 2007/0086543 A1* | 4/2007 | David et al. .................... 375/299 |
| 2007/0223423 A1* | 9/2007 | Kim et al. ...................... 370/334 |
| 2008/0159425 A1 | 7/2008 | Khojastepour et al. |
| 2010/0183085 A1* | 7/2010 | Taoka .................. H04B 7/0417 375/260 |
| 2011/0019573 A1* | 1/2011 | Ezri .............................. 370/252 |
| 2013/0201944 A1 | 8/2013 | Kishigami et al. |

OTHER PUBLICATIONS

Trivellato et al: "Antenna Combining and Codebook Design for the MIMO Broadcast Channel With Limited Feedback"; Conference Record of the IEEE 41st Asilomar Conference on Signals, Systems and Computers, Nov. 2007, pp. 302-308.

* cited by examiner

METHOD FOR COMMUNICATING IN A MIMO NETWORK

FIELD OF THE INVENTION

The present invention relates to a method for communicating in a communication network. More specifically, it relates to a method for communicating between a primary station and one or more secondary stations, in a MIMO (Multiple Input Multiple Output) mode. It also relates to primary stations or secondary stations able to implement such a method.

This invention is, for example, relevant for all wireless communication networks, and in an example of the following description, for a mobile telecommunication network as UMTS, or UMTS LTE.

BACKGROUND OF THE INVENTION

In communication networks, in order to increase the reachable throughput of communication, MIMO (Multiple Input, Multiple Output) has been proposed widely. MIMO involves the use of multiple antennas at both the transmitter and receiver to improve communication performance. It indeed offers significant increases in data throughput without additional bandwidth or transmit power by higher spectral efficiency (more bits per second per hertz of bandwidth) and link reliability.

In an exemplary embodiment of the invention, a mobile communication network comprises a primary station (base station, or NodeB or eNodeB) which can communicate with at least one secondary station (mobile stations, or User Equipment, or UE) with MIMO streams, by using a plurality of primary station antennas and a plurality of secondary station antennas. In order to form the stream, the secondary station provides the primary station with information related to the state of the channel by transmitting CSI (channel state information) feedback to the primary station. Such CSI indicates an optimal or at least a preferred precoding vector to be used in order to maximise the reachable data rate of the corresponding spatially separable data streams transmitted by the primary station. This precoding vector can be a set of complex values to be applied to each antenna port of the primary station during transmission to direct the data stream towards the secondary station antennas.

However, the primary station may also select other precoding vectors to direct data streams towards different secondary stations. If the first secondary station does not select appropriate receive combining weights to apply to the signals received at its receive antennas, it may suffer adverse interference from the data streams directed at other secondary stations.

SUMMARY OF THE INVENTION

It is an object of the invention to propose a method for communicating in a network which alleviates the above described problems.

It is another object of the invention to propose an improved method of communication enabling MIMO to be used with reduced interference between transmissions to different entities, or without requiring too much calculation power in the secondary stations.

To this end, in accordance with an aspect of the invention, a method is proposed for communicating in a network, said network comprising a primary station and at least one secondary station having a plurality of antennas, the method comprising the step of the primary station transmitting to a first secondary station an indication of a first receive combining matrix that the first secondary station should use to combine the signals received at its said plurality of antennas from a first subsequent transmission from the primary station.

As a consequence, the secondary station is able to use an adapted receive vector or matrix for the reception of the subsequent transmission. Indeed, it is possible that the transmission is different from the preferred one (with precoding vectors computed by the secondary station) and this avoids to the secondary station the computation of the optimal receive matrix. Furthermore, the delay may be reduced, for example if the secondary station does not need to try a suboptimal matrix during the first frames of the transmission, likely to be the cause of missed frames.

In accordance with another aspect of the invention, a secondary station is proposed, the secondary station comprising communicating means arranged for communicating with a primary station, the secondary station comprising an antenna array including a plurality of antennas and further comprising means for receiving from the primary station an indication of a first receive combining matrix that the secondary station should use to combine the signals received at its said plurality of antennas from a first subsequent transmission from the primary station, and control means to control the antenna array in accordance with the first receive combining matrix.

In accordance with still another aspect of the invention, a primary station is proposed, the primary station comprising means for communicating with at least one secondary station having a plurality of antennas, the primary station comprising a transmitter arranged for transmitting to the at least one secondary station an indication of a first receive combining matrix that the at least one secondary station should use to combine the signals received at its said plurality of antennas from a first subsequent transmission from the primary station.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
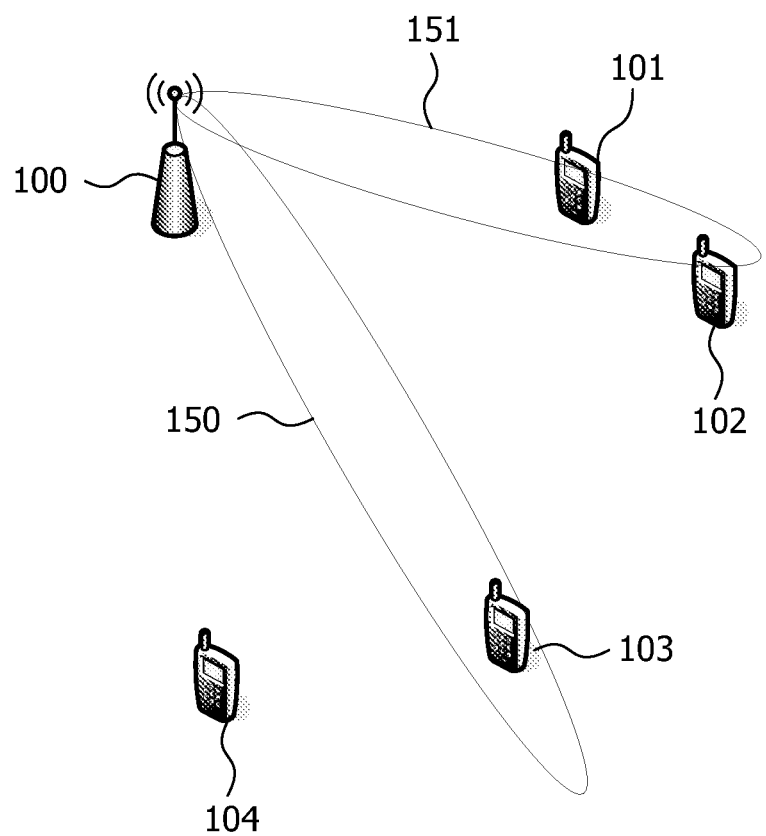
FIG. 1 is a block diagram of a network in accordance with a beamforming scheme maximizing the rate of one secondary station.

The present invention relates to a communication network having a primary station and a plurality of secondary stations communicating with the primary station. Such a network is illustrated for example on FIGS. 1 and 2, where a primary station or base station 100 communicates wirelessly with a plurality of secondary stations 101, 102, 103 and 104. In an illustrative example of the invention, the secondary stations 101-104 are mobile stations or user equipment of a UMTS network.

In accordance with a first embodiment of the invention, the primary station 100 comprises an antenna array comprising a plurality of antennas and a complex gain amplifier so that the primary station 100 is able to carry out beamforming, like MIMO beamforming. Typically, the primary station comprises four antennas. In the most advanced versions of LTE, the primary stations may comprise 8, 16 antennas or more.

Similarly, the secondary stations 101-104 comprise a plurality of antennas, e.g. 2 antennas for the UEs compliant with the first LTE release. In later releases the secondary stations may have 4 or 8 antennas, or even more. Thanks to the antenna arrays, the primary station 100 can form beams of data streams, like the beams 150 and 151 depicted in FIG. 1. In order to form the beam and establish a MIMO communication, the generation of precoding vectors is essential, this generation requiring information about the state of the channel and computation on both the secondary station and the primary station sides.

For example, in the first release of the LTE specifications, the secondary stations configured to receive downlink transmissions in MU-MIMO make measurements of the downlink channel (typically using non-precoded common reference signals (CRS)) and transmit channel state information (CSI) feedback to the primary station, the eNodeB. This indicates a preferred precoding vector to be used for the downlink transmissions (PMI, precoding matrix indicator) and an associated CQI (Channel Quality Information) value indicating the corresponding modulation and coding schemes. In this example, the downlink transmissions are codebook based, meaning that the precoding vectors used for transmission are selected from a finite set. The chosen precoding vector is signalled to the secondary stations so that the secondary station can derive a phase reference as a corresponding linear combination of the Common Reference Signals (CRSs).

A secondary station with a single receive antenna feeds back the index of a single preferred precoding vector which enables the better quality transmission or the most reliable communication, for example the one which maximises the signal to interference ratio SINR at its antenna. This can be based on a predetermined codebook of transmit beamforming vectors, or direct channel vector quantisation (CVQ). In case the secondary station has two (or more) receive antennas, the situation is more complex and the approach taken depends on the size of the codebook available for the quantised CSI feedback. What could be done at such a secondary station would be to feed back the full channel matrix (or at least a quantised version of it). This would however require significant signalling overhead and resource.

In case of Rank-2 transmission, it is possible to feed back a preferred precoding matrix. This is however not appropriate if the secondary station prefers Rank 1 transmission, or is configured in a MIMO mode which only supports Rank-1 transmission, or if the primary station schedules only a Rank-1 transmission.

For Rank-1 transmission, in the case of a relatively small feedback codebook, it is feasible for a secondary station with two receive antennas to determine a single preferred precoding vector by deriving the receive combining vector which maximises the SINR for each transmit beamforming vector in the codebook. This single preferred precoding vector could typically be the MMSE (minimum mean square estimation) receive combining vector. The UE can report the transmit beamforming vector which maximises the maximum SINR.

For a single stream to one secondary station, this approach can be expressed as follows:

1. The received signal is given by y=Hgx+n where
 y is the received signal, a N×1 vector
 x is the transmitted signal, a 1×1 vector
 g is the precoding vector, M×1
 H is the channel matrix, N×M
 n is the noise at each receive antenna, a N×1 vector. For convenience H can be normalised so that the noise variances are equal.
 M is the number of transmit antennas at the eNB
 N is the number of receive antennas at the UE 2. For each possible g in a codebook of size C, compute the receive antenna weight vector w (1×N) such that wy=$\hat{x}$ minimises the error E[x−$\hat{x}$], i.e.: w=(Hg)$^H$((Hg)(Hg)$^H$+σ$^2$I)$^{-1}$ 3. Report the g which maximises the SINR after computing the corresponding MMSE solution for w. This is equivalent to reporting g for a single receive antenna, where g is chosen to maximise the received SINR for an effective 1×M transmission channel given by wH.

4. The eNB scheduler will select pairs of UEs which report orthogonal g's (or at least g's with low cross-correlation).

In the case of channel vector quantisation (CVQ) based feedback, a similar approach may result in a single preferred precoding vector for the feedback. However, this is reliant on an assumption that zero-forcing beamforming at the primary station transmitter, and relies on an approximation of the resulting SINR.

The main drawback of the above approaches is that they do not necessarily maximise the sum rate in a cell with MIMO schemes, and in an example in MU-MIMO, as a higher sum rate might be achieved by choosing a w which enables a different pairing of UEs but which does not maximise the SINR for the individual UE.

This can be illustrated on FIG. 1 with the beam 151 directed from the primary station 100 to the secondary station 101. Even if this beam 151 is the one maximising the SINR of the secondary station 101, it causes significant interference to the secondary station 102. This secondary station 102 will not be able to have a communication with a high SINR because of beam 151 which is directed straight at it.

Moreover, in some cases it is not feasible for the secondary station to compute a single weight vector w which optimises the SINR, and therefore it is not feasible to feed back a single preferred transmit precoding vector. Such cases include:

i) the case of a large feedback codebook, such that the number of different optimisations and SINR calculations becomes prohibitive;

ii) cases where the secondary station does not know the transmit precoding vector e.g.

a. transmit beamforming at the primary station where the phase reference is given by precoded reference signals instead of the CRS and an indicator of the actually-used precoding vector; in this case there is effectively an infinite number of transmit precoding vectors available, for each of which the secondary station would have to derive the optimal weight vector w;

b. channel vector quantisation based feedback, when an assumption of zero-forcing transmit beamforming may not necessarily be valid.

Moreover, in some cases it is not feasible for the secondary station to compute a single w which optimises the SINR. For a given wanted transmission the secondary station does not know about transmissions from other users (i.e. is unaware of the g's selected by the primary station for transmissions to other users), so has a problem calculating the optimal w value(s), to minimise the effect of interference from transmissions to other users.

In accordance with an embodiment of the invention, it is proposed to inform the secondary station of the value of the receive vector w it should use. This avoids the need to inform the secondary station of the precoding (g values) for other users. It also avoids the need for the secondary station to calculate/estimate a value for w which might not be optimal. It is to be noted that without interference from other users, the optimal value of w could be derived from g.

According to a variant of the invention, the primary station, like the eNodeB, signals to the secondary station an indication of the receive beamforming vector w that it should use for combining the signals from its N receive antennas. This would be designed to minimise interference from transmissions for other users. Even with the optimum antenna combining weights signalled as w, the demodulation phase reference could be derived from dedicated reference signals.

In an embodiment of the invention, the primary station transmits the optimal receive vector w which is based on the precoding vector that is computed by the primary station itself. Indeed, this embodiment of the invention is based on the fact that for the cases identified above a large or even infinite number of w's are possible. This means that by varying w, it may be possible for the base station to select pairs of secondary stations which maximise the sum rate while not necessarily maximising the rate for any individual secondary station.

Figure 2:
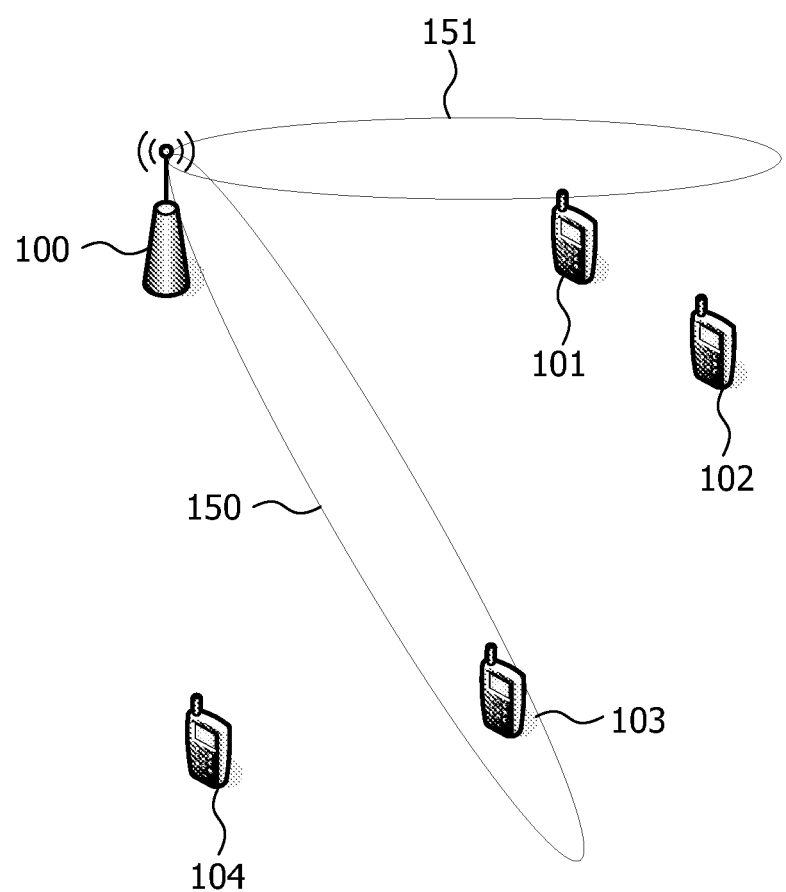
FIG. 2 is a block diagram of a network in accordance with an embodiment of the invention.

This exemplary variant of the first embodiment of the invention is depicted in FIG. 2, where the primary station 100 is able to direct the beam 151 so that the secondary station 102 is not disturbed by it. Even if the beam 151 does not provide the highest possible SINR value for the secondary station 101, the sum rate achievable for all the secondary stations can be better since the secondary station 102 is not interfered with by the beam 151 dedicated to another secondary station, namely 101.

To achieve this, it is proposed, in accordance with a first embodiment of the invention, that the secondary station feeds back to the primary station a set of preferred precoding vectors, the number of precoding vectors being greater than the rank of transmission. The primary station then computes a precoding vector by combining the received precoding vectors. The primary station may determine first the preferred rank of the transmission and configure the secondary station beforehand. Then, this permits that the secondary station is aware of the number of required precoding vectors that need to be fed back to the primary station. It also permits to reduce the computation requirement at the secondary station which can be more limited than the primary station in terms of computation power.

It is however possible to let the secondary station decide on the preferred rank of transmission depending on the state of the channel so that it permits an optimal use of the channel. In such a case, the secondary station signals to the primary station the preferred rank of transmission.

According to a variant of the first embodiment, when applied in the case of two receive antennas at the secondary station or UE in a LTE network, each UE feeds back two precoding vectors g's, $g_1$ and $g_2$, even when rank-1 transmission is preferred. Each precoding vector g can be computed as above, by selecting two preferably-orthogonal receive vectors $w_1$ and $w_2$ which are known or have a relationship which is known, possibly a priori, to both the primary station and the secondary station.

According to an advantageous embodiment the first receive vector $w_1$ is computed to maximise the rate for a codebook-based feedback approach as described above. A corresponding CQI value, computed using this value of w, is also fed back, which gives sufficient information for the case when no other secondary stations end up being scheduled for transmission at the same time. The second vector $w_2$ can then be chosen as an orthogonal vector of $w_1$ (which gives sufficient information for optimal scheduling of another secondary station), and a second CQI value is computed for this value of w and is fed back as well. The secondary station also feeds back the corresponding g values, $g_1$ and $g_2$.

For two receive antennas at the secondary station, a suitable embodiment could use w vectors $w_1$[1 1] and $w_2$=[1 −1] for example, or [0 1] and [1 0] corresponding to receive antenna selection.

It is to be noted that this exemplary embodiment of the invention can be extended to a secondary station with N reception antennas, in which case w is a vector of dimension 1×N. In such a case, the secondary station could transmit preferred precoding vector feedback corresponding to up to N w vectors. For example, if N=4, the secondary station could feed back 4 preferred precoding vectors, corresponding to $w_1$, $w_2$, $w_3$ and $w_4$.

In accordance with a variant of the above example, the secondary station could send a reduced amount of feedback corresponding to less than N w's. In such a case (e.g. for 2 w's), the choice of which particular w's could take into account the correlation between the receive antennas in order to maximise the information fed back to the primary station.

For example, if $w_1$ is selected to maximise the rate, then possible multipliers for generating $w_2$, $w_3$, and $w_4$ could be [1 1 −1 −1], [1 −1 1 −1], and [1 −1 −1 1]. Using $w_2$ is likely to be preferable to $w_3$ or $w_4$ (i.e. it would give the eNodeB more information) assuming that the antennas are indexed in order of separation (and hence correlation).

As a further aspect of the invention, therefore, the secondary station selects the second w according to the correlation between the antennas (as the primary station does not need to know the relationship between the antenna index and the physical antenna at the secondary station).

In another embodiment, the secondary station selects and feeds back the n w's which have the highest SINRs where n<N.

As a further example, if $w_1$ is selected as [1 1 1 1], then possible values for $w_2$, $w_3$, and $w_4$ could be [1 1 −1 −1], [1 −1 1 −1], and [1 −1 −1 1].

In an embodiment where N=2, the primary station scheduler is then free to select any $g_A$ for user A as a linear combination of $g_1$ and $g_2$ which orthogonalises $g_A$ and a similarly-derived $g_B$ for user B. This can be extended to N>2, where the secondary station reports two (or more) values of g, and the eNB applies precoding which is a linear combination of the reported values.

If the secondary station reports N values of g corresponding to N values of w, this provides the eNB with some information on the full channel matrix. However, this has some advantages over known methods, since it is not necessary to specify the ordering of the receive antennas, and the computational complexity is likely to be lower for equivalent accuracy of channel representation (i.e. N searches of a codebook size C, compared with one search of a codebook size CN).

Alternatively, the invention could be used in conjunction with other sources of knowledge of the preferred precoding vector and channel, for example by means of reciprocity in a TDD system.

This invention is also applicable to rank >1 transmission, where the eNB signals an indication of a receive processing matrix to the UE instead of a vector.

In a preferred embodiment the receive beamforming vector w is used by the secondary station in demodulation of a transmitted signal. In another embodiment the w is used by the secondary station to compute a value of CQI for reporting to the primary station.

In a variant of the invention, the primary station is a mobile terminal like a User Equipment, and the primary station is a base station like a eNodeB.

The invention may be applicable to mobile telecommunication systems like UMTS LTE and UMTS LTE-Advanced, but also in some variants to any communication system having allocation of resources to be done dynamically or at least semi persistently.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for communicating in a network, the network comprising a base station and at least one secondary station, the method comprising:
   a base station computing via a processor, an indication of a first receive combining matrix that predefines multiple receiver weights for use by a first secondary station having multiple antennas,
   the base station transmitting via the controller and a transceiver through a plurality of antennas, in a first transmission, to a first secondary station of one or more secondary stations, an indication of a first receive combining matrix that predefines receiver weights for use by the first secondary station, and
   the first secondary station using the receiver weights, received from the base station in the first transmission, to combine signals received at the first secondary station's plurality of antennas from a subsequent second transmission from the base station.

2. A secondary station comprising:
   a transceiver arranged for communicating with a base station,
   an antenna array including a plurality of antennas arranged for receiving from the base station a first transmission indicating a first receive combining matrix that predefines calculated receiver weights that the secondary station uses to combine signals received at the plurality of antennas in a second subsequent transmission from the base station, and
   a controller for controlling the antenna array in accordance with the first receive combining matrix.

3. The secondary station claim 2, wherein the first receive combining matrix is a vector.

4. The secondary station claim 2, wherein the primary station selects a first precoding matrix to be applied at the primary station to the subsequent second transmission from the primary station, and wherein the first receive combining matrix corresponds to the first precoding matrix.

5. The secondary station claim 2, wherein the primary station selects a first precoding matrix to be applied at the primary station to the subsequent second transmission from the primary station, and the first precoding matrix is a vector.

6. The secondary station claim 2, wherein the first receive combining matrix is selected so that it reduces the interference to reception of the second transmission by the first secondary station from transmissions to at least one other secondary station.

7. The secondary station claim 2, wherein the first receive combining matrix is selected so that it reduces the interference to reception of the second transmission by the first secondary station from transmissions to at least one other secondary station, and wherein a second receive combining matrix is selected by the primary station for a second secondary station, and wherein the first receive combining matrix and the second receive combining matrix are selected by the primary station such that the sum rate of the first secondary station rate and of the second secondary station rate is increased.

8. The secondary station claim 2, wherein the first secondary station transmits to the primary station a transmission indicating a first plurality of precoding vectors, wherein the number of first precoding vectors is greater than a preferred rank of transmission from the primary station to the first secondary station.

9. The secondary station claim 2, wherein the first secondary station transmits to the primary station a transmission indicating a first plurality of precoding vectors, wherein the number of first precoding vectors is greater than a preferred rank of transmission from the primary station to the first secondary station, and the first secondary station derives each precoding vector of the first set according to a different corresponding receive combining vector.

10. The secondary station claim 2, wherein the first secondary station transmits to the primary station a transmission indicating a first plurality of precoding vectors, wherein the number of first precoding vectors is greater than a preferred rank of transmission from the primary station to the first secondary station, and the first secondary station derives each precoding vector of the first set according to a different corresponding receive combining vector, and the receive combining vectors are orthogonal to each other.

11. The secondary station claim 2, wherein the first secondary station transmits to the primary station a transmission indicating a first plurality of precoding vectors, wherein the number of first precoding vectors is greater than a preferred rank of transmission from the primary station to the first secondary station, and the primary station selects a first transmission precoding vector based on a combination of the first precoding vectors of the first set.

12. The secondary station claim 2, wherein the first secondary station transmits to the primary station a transmission indicating a first plurality of precoding vectors, wherein the number of first precoding vectors is greater than a preferred rank of transmission from the primary station to the first secondary station, and the primary station selects a first transmission precoding vector based on a combination of the first precoding vectors of the first set, and the combining of signals includes selecting a second transmission precoding vector based on a combination of second precoding vectors of a second set of precoding vectors, the second set being indicated by a second secondary station, and wherein the first transmission precoding vector and the second transmission precoding vector are selected so that the sum rate of the first secondary station rate and of the second secondary station rate is maximized.

13. The secondary station claim 2, wherein the first secondary station transmits to the primary station a transmission indicating a first plurality of precoding vectors, wherein the number of first precoding vectors is greater than a preferred rank of transmission from the primary station to the first secondary station, and the primary station selects a first transmission precoding vector based on a combination of the first precoding vectors of the first set, and the combining of signals includes selecting a second transmission precoding vector based on a combination of second precoding vectors of a second set of precoding vectors, the second set being indicated by a second secondary station, and wherein the first transmission precoding vector and the second transmission precoding vector are selected so that the sum rate of the first secondary station rate and of the second secondary station rate is maximized, and the first transmission precoding vector and the second transmission precoding vector are orthogonal.

14. A base station comprising:
   a processor computing an indication of a first receive combining matrix that predefines receiver weights for use by a at least one secondary station, and
   a transmitter including an antenna array including a plurality of antennas transmitting to a at least one secondary station an indication of a first receive combining matrix that predefines receiver weights that the at least one secondary station for combining the signals received at a plurality of receive antennas in a second transmission from the base station.

15. The base station claim 14, wherein the first receive combining matrix is a vector.

16. The base station claim 14, wherein the primary station selects a first precoding matrix to be applied at the primary station to a subsequent second transmission from the primary station, and wherein the first receive combining matrix corresponds to the first precoding matrix.

17. The base station claim 14, wherein the primary station selects a first precoding matrix to be applied at the primary station to a subsequent second transmission from the primary station, and the first precoding matrix is a vector.

18. The base station claim 14, wherein the indicated first receive combining matrix is selected so that it reduces the interference to reception of the second transmission by the first secondary station from transmissions to at least one other secondary station.

19. The base station claim 14, wherein the indicated first receive combining matrix is selected so that it reduces the interference to reception of the second transmission by the first secondary station from transmissions to at least one other secondary station, and wherein the primary station selects a second receive combining matrix for a second secondary station, and wherein the first receive combining matrix and the second receive combining matrix are selected by the primary station such that the sum rate of the first secondary station rate and of the second secondary station rate is increased.

20. The base station claim 14, wherein the first secondary station transmits to the primary station a transmission indicating a first plurality of precoding vectors,
   wherein the number of first precoding vectors is greater than a preferred rank of transmission from the primary station to the first secondary station.

21. The base station claim 14, wherein the first secondary station transmits to the primary station a transmission indicating a first plurality of precoding vectors, wherein the number of first precoding vectors is greater than a preferred rank of transmission from the primary station to the first secondary station, and the first secondary station derives each precoding vector of the first set according to a different corresponding receive combining vector.

22. The base station claim 14, wherein the first secondary station transmits to the primary station a transmission indicating a first plurality of precoding vectors, wherein the number of first precoding vectors is greater than a preferred rank of transmission from the primary station to the first secondary station, and the first secondary station derives each precoding vector of the first set according to a different corresponding receive combining vector, and the receive combining vectors are orthogonal to each other.

23. The base station claim 14, wherein the first secondary station transmits to the primary station a transmission indicating a first plurality of precoding vectors, wherein the number of first precoding vectors is greater than a preferred rank of transmission from the primary station to the first secondary station, and the primary station selects a first transmission precoding vector based on a combination of the first precoding vectors of the first set.

24. The base station claim 14, wherein the first secondary station transmits to the primary station an indication of a first plurality of precoding vectors, wherein the number of first precoding vectors is greater than a preferred rank of transmission from the primary station to the first secondary station, and the primary station selects a first transmission precoding vector based on a combination of the first precoding vectors of the first set, and the combining of signals includes selecting a second transmission precoding vector based on a combination of second precoding vectors of a second set of precoding vectors, the second set being indicated by a second secondary station, and wherein the first transmission precoding vector and the second transmission precoding vector are selected so that the sum rate of the first secondary station rate and of the second secondary station rate is maximized.

25. The base station claim 14, wherein the first secondary station transmits to the primary station a transmission indicating a first plurality of precoding vectors, wherein the number of first precoding vectors is greater than a preferred rank of transmission from the primary station to the first secondary station, and the primary station selects a first transmission precoding vector based on a combination of the first precoding vectors of the first set, and the combining of signals includes selecting a second transmission precoding vector based on a combination of second precoding vectors of a second set of precoding vectors, the second set being indicated by a second secondary station, and wherein the first transmission precoding vector and the second transmission precoding vector are selected so that the sum rate of the first secondary station rate and of the second secondary station rate is maximized, and the first transmission precoding vector and the second transmission precoding vector are orthogonal.

26. A method of operating a secondary station, the method comprising the acts of:
   in a secondary station:
      a transceiver communicating with a base station,
      an antenna array including a plurality of antennas receiving from the base station a first transmission indicating a first receive combining matrix that predefines calculated receiver weights that the transceiver and the controller use to combine the signals received at the plurality of antennas in a subsequent second transmission from the base station, and
   the controller controlling the transceiver in accordance with the first receive combining matrix.

27. A method of operating a base station, the method comprising the acts of:
   computing by a processor an indication of a first receive combining matrix that predefines receiver weights for use by a at least one secondary station, and
   a transmitter including an antenna array including a plurality of antennas transmitting to a at least one secondary station an indication of a first receive combining matrix that predefines receiver weights that the at least one secondary station for combining the signals received at a plurality of receive antennas in a second transmission from the base station.

28. A tangible computer-readable storage medium, comprising all computer-readable storage medium that is not a transitory propagating signal or wave, the medium modified by control information including instructions for performing a method of operating a secondary station, the method comprising performing the acts of:

communicating via a transceiver with a base station, an antenna array including a plurality of antennas receiving from the base station a first transmission indicating a first receive combining matrix that predefines calculated receiver weights that the secondary station uses to combine the signals received at its the plurality of antennas in a second transmission from the base station, and controlling the antenna array via a controller in accordance with the first receive combining matrix.

29. A tangible computer-readable storage medium comprising all computer-readable storage medium that is not a transitory propagating signal or wave, the medium modified by control information including instructions for performing a method of operating a base station, the method comprising:

computing via a processor an indication of a first receive combining matrix that predefines receiver weights for use by a at least one secondary station, and a transmitter including an antenna array including a plurality of antennas transmitting to a at least one secondary station an indication of a first receive combining matrix that predefines receiver weights that the at least one secondary station for combining the signals received at a plurality of receive antennas in a second transmission from the base station.

\* \* \* \* \*